Sept. 23, 1958

J. H. DONNELLY 2,853,100

LIQUID FLOW CONTROL VALVE

Filed June 23, 1952

INVENTOR.
JOHN H. DONNELLY
BY
ATTORNEYS

Sept. 23, 1958    J. H. DONNELLY    2,853,100
LIQUID FLOW CONTROL VALVE
Filed June 23, 1952    3 Sheets-Sheet 2

INVENTOR.
JOHN H. DONNELLY
BY
ATTORNEYS

Sept. 23, 1958     J. H. DONNELLY     2,853,100
LIQUID FLOW CONTROL VALVE

Filed June 23, 1952     3 Sheets-Sheet 3

*INVENTOR.*
JOHN H. DONNELLY
BY
ATTORNEYS

United States Patent Office 2,853,100
Patented Sept. 23, 1958

2,853,100

LIQUID FLOW CONTROL VALVE

John H. Donnelly, New York, N. Y.

Application June 23, 1952, Serial No. 295,069

6 Claims. (Cl. 137—604)

This invention relates to a valve for controlling the flow of liquids and, more particularly, to a dispensing valve adapted to dispense carbonated water either alone or mixed with one of two flavored syrups.

It is an object of the present invention to provide a valve for dispensing carbonated beverages in which carbonated water will be mixed with a selected flavored syrup as the beverage is dispensed.

It is another object of this invention to provide a valve which will be self-rinsing, i. e., after a serving of a beverage has been dispensed in which the carbonated water is mixed with a syrup A, all of the syrup A will be rinsed from the portion of the valve which may be called upon to carry a syrup B when the next serving is dispensed.

It is another object of the invention to provide accessible and positive means for metering for the syrup flow.

It is another object of the invention to provide a valve which may be disassembled to permit the cleaning of the syrup passages and the replacement of syrup flow control means without necessitating the shutting off of the carbonated water supply to the valve.

It is still another object of the invention to provide means for dispensing carbonated water which will serve to deliver carbonated water retaining a maximum content of the dissolved carbon dioxide.

These and other objects of the invention will become apparent from the following description when read in conjunction with the accompanying drawings, in which.

Figure 1:
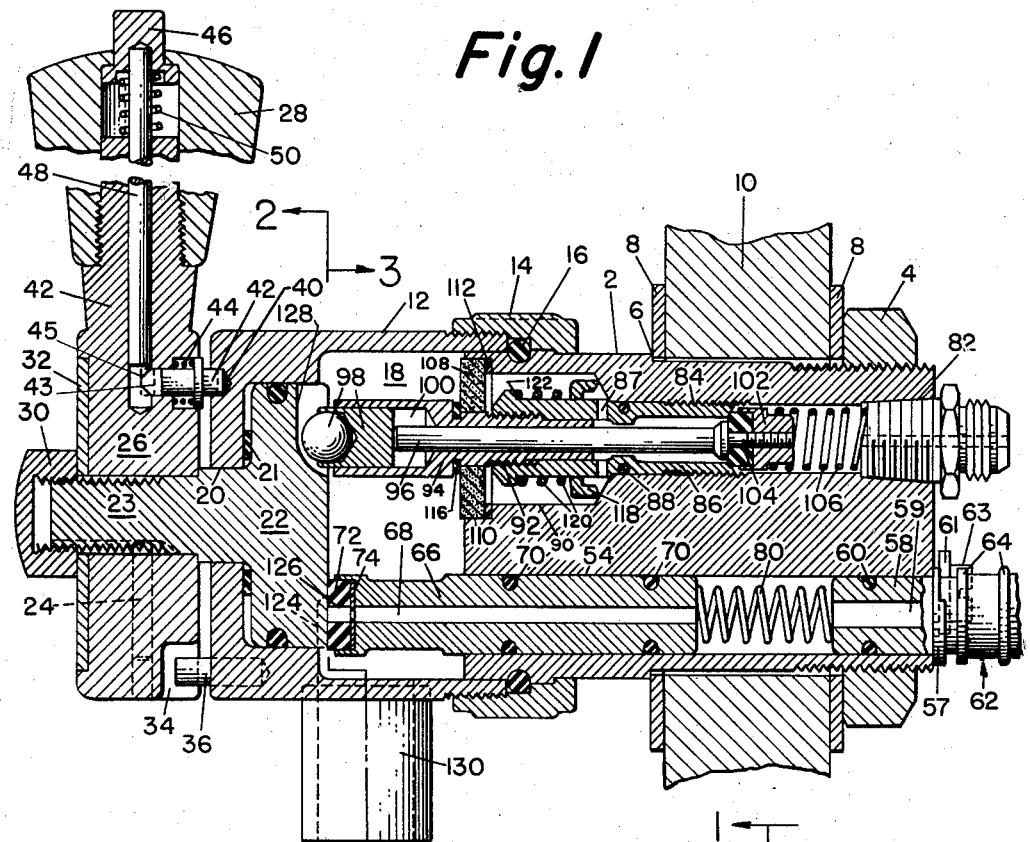
Figure 1 shows a longitudinal section of the valve assembly taken on the trace indicated at 1—1 in Figure 3.
Figure 2:
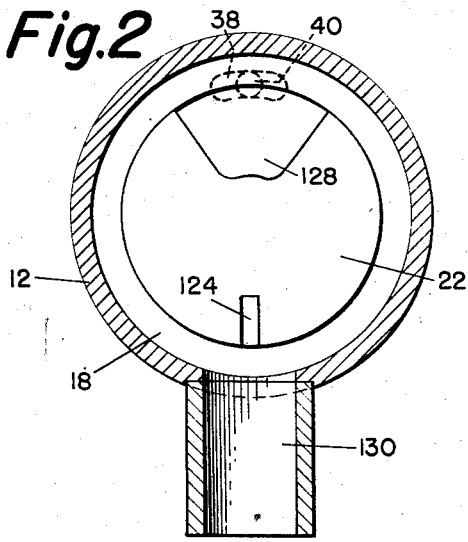
Figure 2 is a transverse section taken on the trace 2—2 of Figure 1.
Figure 3:
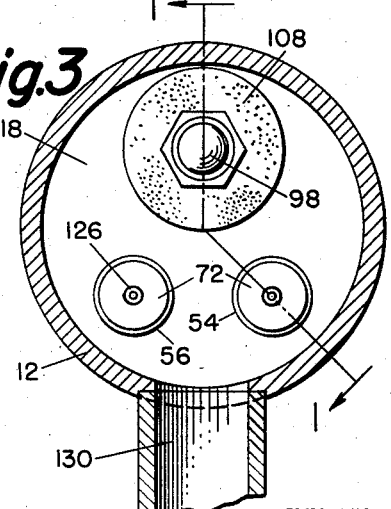
Figure 3 is a transverse section taken on the trace 3—3 of Figure 1.

Referring to Figures 1-4 there is shown a valve shank 2 which is provided with a shank nut 4 and a shoulder 6 between which there may be engaged a pair of washers 8 and a member 10 which may be, for example, a panel on a counter or wall providing means in which the beverage dispensing valve is mounted.

A valve body 12 is attached to the valve shank 2 by means of a coupling ring 14. The O ring 16 is provided to prevent the fluids existing in the chamber 18, as will be hereinafter described, from flowing between the valve body 12 and the coupling ring 14.

Rotatably mounted in the bore 20 in the valve body is a valve cam 22. Keyed to the threaded stem 23 of the valve cam 22 by means of the pin 24 is the rotary actuator 26. Mounted on the upper portion of the rotary actuator 26 is the valve handle 28. The cam stem nut 30 which is threaded on the cam stem engages the disc 32 and retains the rotary actuator 26 in position on the cam stem 23.

The lower portion of the rotary actuator 26 is provided with a cut-out region 34 into which extends the pin 36 which is mounted in the valve body 12. The arcuate extent of the cut-out region 34 serves to limit the rotation of the rotary actuator 26 and the valve cam 22 as a result of engagement of the end of the cut-out 34 with the pin 36.

The valve body 12 is provided with the arcuately extending recess 38 which has a central depression 40. The pin 42 slidably mounted in the rotary actuator 26 is urged into engagement with the receses 38 and 40 by the action of the spring 44.

Centrally mounted in the upper portion of the valve handle 28 is the button member 46 which has extending downwardly therefrom the rod 48. The button and rod assembly are urged upwardly by the spring 50. The lower end of the rod 48 is adapted to pass between the left hand end of the pin 42 and the plug 52 when the button 46 is depressed, thus limiting the travel of the pin 42 to such a degree as to prevent rotation of the rotary actuator 26 beyond the point in either direction at which the pin 42 engages an end of the groove 38.

Figure 4:
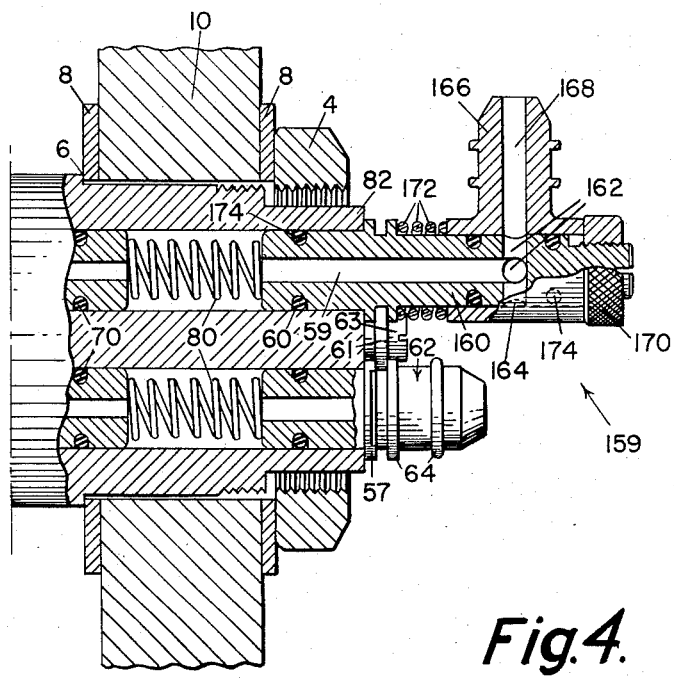
Figure 4 is a partially cut away top view of the right hand end of the valve assembly as viewed in Figure 3.

The valve shank is provided with three longitudinal bores. The two lower bores 54 and 56 are provided to carry the flow of syrup. Inserted into the rear end of each of the bores 54 is a bushing 58 which is provided with a central bore 59 for conducting the syrup flow and O rings 60 to prevent leakage of syrup between the bushing and the bore 54. The bushing 58 is provided with a rim 57 which is engaged by the rim 61 of the lock screw 63. The outer end of the bushing, indicated generally at 62, may be provided with a flow control valve such as is shown in Figure 4 and will be hereinafter described or, alternately, may simply be provided with a nipple carrying the ribs 64, as shown in Figure 1, for the reception of a plastic or other suitable syrup supply line.

Mounted within the forward or left hand end of each of the bores 54 and 56 is a bushing 66 which is provided with a central bore 68 for the passage of syrup. The O rings 70 are provided to prevent passage of syrup between the bushing 66 and the wall of the bore 54. Mounted in the left hand end of the bushing 66 is the syrup nozzle gasket 72 and back of the syrup nozzle gasket there is located a syrup orifice disc 74. Between the bushing 66 and the bushing 58 there is positioned a spring 80 which serves to urge the bushing 66 to the left, as viewed in Figure 1, causing the syrup nozzle gasket 72 to remain firmly engaged with the face of the valve cam 22, the bushing 58 being held in position by the engagement of its flange 57 against the flange 61 of the lock screw.

The urging of the spring 80 in the syrup bores 54 and 56 against their respective bushings 66 is transmitted to the valve cam 22 which, in turn, bears against the valve body 12 through the washer 21 which is provided between the valve cam 22 and the valve body 12. The washer 21 is preferably formed of a material such as polyethylene which does not affect and is unaffected by the beverages and provides as an anti-friction surface.

The upper bore in the valve shank 2 is provided at its right hand end with the threaded portion 82 for connection to a carbonated water supply line. Threaded into the reduced diameter portion 84 of the bore is the sleeve member 86. The O ring 88 is provided to prevent leakage from the right hand end of the sleeve 86 between the sleeve and the valve shank to the space within the enlarged portion of the bore 90. Threaded into the sleeve 86, as shown at 92, is the valve stem sleeve 94, and slidably mounted within the valve stem sleeve 94 is the valve stem 96. The button and ball assembly 98 is slidably mounted within the bore 100 in the enlarged left hand end portion of the valve stem sleeve 94. The right hand end of the valve stem 96 is threaded into the valve member 102 in which is retained the valve gasket 104. The valve gasket 104 is urged against the right hand end of the sleeve 86 by the urging of the spring 106 which is positioned between the valve member 102 and the bushing which is inserted into the threaded bore 82 and connected to the soda supply line.

The porous disc 108 is seated in the recess 110 and held against the gasket 112 by the shoulder of the enlarged portion of the sleeve 94 bearing against the gasket 116.

Mounted within the enlarged bore 90 and slidable upon the sleeve 86 is the washer 118. The spring 120 acting between the washer 118 and the shoulder 122 of the sleeve 86 holds the washer 118 to the right in engagement with the tapered end of the bore 90.

The valve cam 22 is provided with the slot 124 which is adapted to be in alignment with the central bore 126 of one of the syrup nozzle gaskets when the valve handle is rotated to an extreme position one way or the other as determined by the pin 36 and cut-out 34. When the valve is in an off position, the position of the parts shown in the drawing, the syrup nozzle gaskets are in engagement with the flat face of the valve cam 22 and are thus both sealed off. When the valve cam 22 has been rotated to an extreme position, the slot 124 permits the flow of syrup through the bore 68, the syrup orifice disc 74, the syrup nozzle gasket 72 into the chamber 18 from which it flows through the valve spout 130. It will be noted that this arrangement requires that the valve handle be rotated to one or the other of its extreme positions before syrup can flow.

The valve cam 22 is also provided with the enlarged recess 128 which is in alignment wtih the valve stem ball 98 when the valve handle is in an off position. The parts are so dimensioned that, when the valve cam is in the off position as shown in Figure 1, the valve stem ball does not engage the face of the recess 128 and, therefore, the valve gasket 104 blocks the flow of carbonated water through the sleeve 86.

When the valve cam is rotated sufficiently so that the ball 98 is engaged and depressed by the flat face of the valve cam 22 beyond the recess portion 128, the valve stem 96 is depressed, moving the valve member 102 and the valve gasket 104 to the right, as viewed in Figure 1, against the urging of spring 106. This motion of the valve gasket permits the flow of carbonated liquid between the valve member 102 and the wall of the bore, through the annular passage between the valve stem 96 and the wall of the bore through the sleeve 86, through the bores 87, which are radially arranged in the sleeve 86, and between the outer edge of the washer 118 and the wall of the bore 90 into the chamber within the bore 90 and back of the porous disc 108. Liquid flowing through the bores 87 will initially apply pressure on the rear or right hand face of the washer 118 and will tend to move the washer 118 to the left against the urging of spring 120. There will be some liquid and some gaseous carbon dioxide remaining between the disc 108 and the washer 118 from the previous operation of the valve. In the next successive operation the movement of the washer 118 to the left compresses this gas and drives it and the residual liquid through the porous disc. At the same time, however, the incoming carbonated water is flowing around the washer 118 and, as the liquid pressure on the left side of the washer 118 increases, the washer will move to the right and assume an equilibrium position and may serve as a pressure reducing valve. The washer 118 also provides means for absorbing the shock or limiting the inrush of carbonated water into the chamber within the bore 90 and thus effectively reduces the shock of a sudden pressure change and effectively reduces the degree of carbon dioxide liberation occurring at this stage of the liquid delivery.

As pressure builds up in the chamber within the bore 90, carbonated water is forced through the porous disc 108. The porous disc 108 is made preferably from sintered stainless steel powder and has sufficient porosity to permit a satisfactory flow of carbonated water at the pressures involved and will not react therewith. The carbonated water passing through the disc 108 enters the chamber 18 and flows downwardly therein around the bushings 66 and out through the valve spout 130.

It will be apparent that, by limiting the spread of the recess 128 in the valve cam, flow of carbonated water will occur both before and after the flow of flavored syrup from one of the bushings 66 through the slot 124 in the face of the valve cam. Thus the walls of the chamber 18 are protected by a film of carbonated water before the flavored syrup flow commences and are washed or rinsed by carbonated water after the flow of sugar syrup is terminated.

Referring specifically to the control for the carbonated water, one of the features of this invention is that there is delivered through the valve carbonated water having a higher content of dissolved carbon dioxide than is obtained by the use of conventional valves. This is accomplished by the successive and gradual reduction of pressure of the carbonated water as it flows through the bores 87, past the shock absorber washer 118 and through the porous disc 108. As previously described, the initial inrush of carbonated water through the bores 87 into the chamber within the bore 90 is restricted by the spring loaded washer 118. Thus there is provided a gradual rather than a sharp or sudden drop in pressure in the carbonated water passing through this portion of the apparatus. Secondly, the carbonated water, passing from this chamber through the porous disc 108 and undergoing a dropping in pressure to substantially atmospheric pressure in the chamber 118, undergoes this pressure change gradually as the carbonated water flows through the porous disc 108. It is well known that shock or impact will stimulate the liberation of carbon dioxide from a solution which is under temperature and pressure conditions at which carbon dioxide is being liberated. It will be evident that the shock absorber washer 118 and the porous disc 108 provide for the reduction in pressure of the carbonated water from the supply line pressure to atmospheric pressure in a gradual manner, avoiding the high pressure gradient which exists across the orifice of the conventional type valve. As a result of this structure, the carbonated water contains a higher percentage of dissolved carbon dioxide than is found in carbonated water delivered by conventional valve apparatus.

If the valve handle is moved a distance sufficient to rotate the valve cam to the point where the carbonated water valve is open and yet not sufficiently far to bring the slot 124 into alignment with one of the syrup nozzles, there will be delivered unflavored carbonated water. In order to facilitate the determining of this intermediate position by an operator, an arcuate recess 38 may be provided in the face of the valve body 12, and, as the valve handle is rotated, an operator can feel when the pin 42 comes into engagement with one end of the arcuate recess 38.

As an additional aid in determining this position, the button 46 and the stem 48 may be additionally provided in the handle so that, upon depression of the button 46, the rod 48 moves downwardly back of the pin 42 limiting the rearward motion of the pin and preventing rotation of the valve cam beyond the point at which the pin 42 engages an end of the arcuate slot 38.

Figure 5:
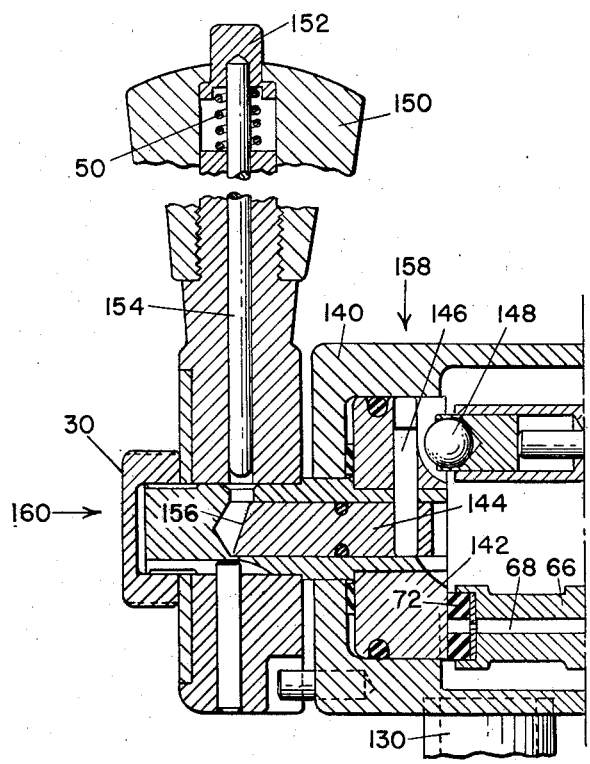
Figure 5 is a fragmentary longitudinal section of the valve showing a modification thereof.

An alternate means for effecting independent flow of the carbonated water is shown in Figure 5 in which there is mounted in a valve body 140 a valve cam 142. In the valve cam 142 there is mounted the rod 144 which has affixed to its end the pin 146 which is in alignment with the valve stem ball 148 when the valve handle 150 is in a neutral or vertical position. Depression of the button 152 in the valve handle depresses the rod 154 bearing against the cam surface 156 of the left hand end of the rod 144 and causes the rod to move to the right as viewed in the figure causing the upper end of the pin 146 to depress the valve stem ball 148 and open the carbonated water flow control valve. This form of the invention provides a flow of carbonated water without valve rotation.

It will be evident that flow of carbonated water alone may be accomplished by various other alternate means. For example, a stem could be passed through the valve body in the area indicated by the arrow 158 and, by downward pressure of the hand, be made to engage the ball 148 to actuate the carbonated water flow control valve.

Horizontal pressure applied in the direction indicated by the arrow 160 in Figure 5 would serve to actuate the carbonated water flow in the valves shown in either Figure 1 or Figure 5 by sliding the rotatable stem and cam inwardly and depressing the ball 148. The bushings 66 would slide inwardly into the bores in the valve shank 2 comprising their respective springs 80 and syrup flow would not occur.

Alternately, the form of the invention shown in Figure 5 could be modified by extending the rod 144 to the left and through the nut 30. The left end of the rod 144 could then be provided with a suitable knob and pressure upon the knob, exerted by the operator, would cause the rod 144 to move to the right causing the pin 146 to depress the ball 98.

The valve arrangement shown generally by the arrow 159 in Figure 4 may be used in addition to or in place of the syrup orifice disc 72 to control the flow of syrup. This valve includes a shank portion 160 which is an extension of the shank 58 and is provided with diametrical bores 162 connecting the central passage 59 with a circumferential groove 164. Slidably mounted on the outside of the member 160 is the T-fitting 166 having a bore 168 adapted to communicate with the circumferential groove 164. The outer end of the member 160 is threaded and carries the adjusting nut 170 which holds the T-fitting 166 in position on the member 160 against the urging of the spring 172. By rotating the nut 170, the T-fitting may be positioned longitudinally on the member 160. Leakage between the T-fitting and the member is prevented by the O rings 174. Adjustment of the nut 170 will cause the bore 168 to assume various positions with respect to the circumferential groove 164 and thus effectively provide a flow metering apparatus.

It will be observed that in the entire valve assembly screw threads and dead-ended bores do not exist in the syrup flow means. It will further be observed that the apparatus conducting syrup flow is readily removable in order that the apparatus may be disassembled for cleaning. The syrup nozzle gaskets 72 may be easily replaced when they become worn, and the syrup orifice discs 74 may be easily replaced when it is desired to change the rate of syrup flow.

The valve body, the valve shank, the valve cam and the various other parts in contact with either the syrup or the carbon dioxide flow are all preferably made of stainless steel with the exception, of course, of the various O rings and gaskets which are made of a synthetic rubber such as neoprene and the plastic thrust washer 21.

While the invention has been described in the form of a beverage dispensing valve in which carbonated water and flavored syrups are involved, it will be evident that the valve may be employed in various applications to mix numerous liquids and to control the flow of various liquids having gases dissolved therein.

While the porous disc 108 has been described as being preferably composed of sintered stainless steel in the beverage dispensing valve, it will be evident that in various applications this disc may be composed of any suitable foraminous material selected to provide passages of suitable size in consideration of the viscosity of the liquid to be passed therethrough and the pressures involved, and to be unaffected by the liquids passed therethrough.

Figure 6:
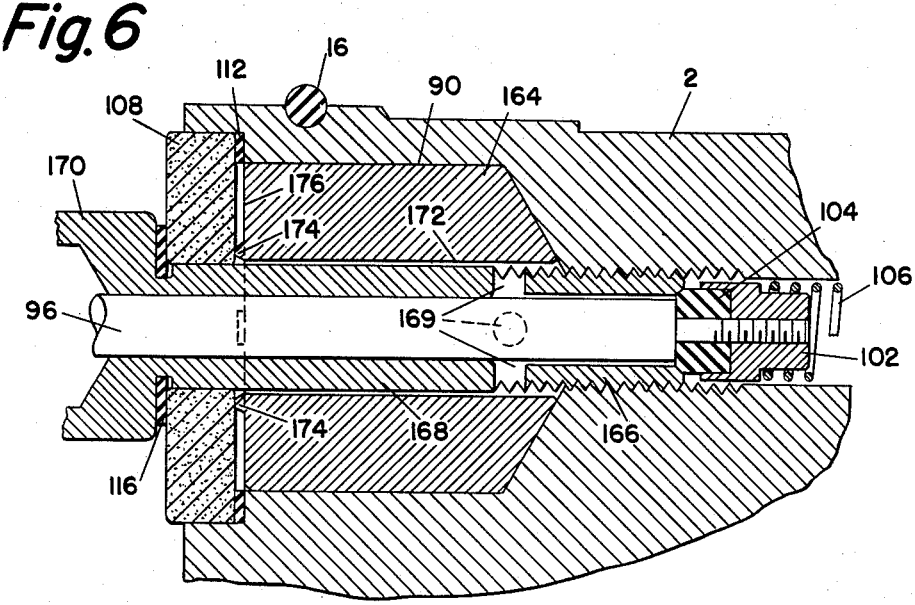
Figure 6 is a fragmentary longitudinal section of the valve assembly showing a modified form of the soda delivery section of the valve.

Figure 6 shows an alternate form of the soda delivery section of the valve in which the shock absorber washer 118 and spring 120, as shown in Figure 1, are replaced by a spreader plug 164. The sleeves 86 and 94 shown in Figure 1 are replaced by a single sleeve 166—168. The sleeve 166 provides a valve seat at its left end, as viewed in Figure 6, which receives the valve gasket 104 mounted on the stem 96 in a manner identical to that described in connection with Figure 1.

The interior bore 172 of the spreader plug 164 is of such a diameter to provide a slight clearance between the inner surface of the spreader plug and the outer surface of the sleeve 168. The left end face 176 of the spreader plug 164, as viewed in Figure 6, is provided with a plurality of circumferentially arranged spaced projections 174. These projections rise above the end face 176 of the spreader plug and are adapted to engage the adjacent face of the sintered disc 108.

In this form of the invention the carbonated liquid flows past the valve 104 when the valve has been opened, through the annular space between the sleeve 166 and the stem 96, through bores 169 in the sleeve 166, through the annular space between the inner surface of the plug 164 and the outer surface of the sleeve 168 to the space between the sintered disc 108 and the end face 176 of the plug 164. This succession of paths provides a gradually increasing cross sectional area for flow of the carbonated liquid and it will be evident that the pressure existing in any annular region in the space between the end face 176 of the plug and the sintered disc 108 will depend upon the relation between the thickness of this space in a dimension parallel to the longitudinal axis of the plug and the porosity of the sintered disc 108. By properly adjusting these two factors, a material reduction in pressure of the carbonated liquid may be accomplished before the liquid passes into the sintered disc.

Thus the arrangement shown in Figure 6 provides a progressive drop in pressure of the carbonated liquid as it passes from the valve 104 to the rear face of the sintered disc 108. This arrangement provides a more extended time interval during which the pressure of the carbonated liquid is being reduced than is provided by the arrangement shown in Figure 1 and, therefore, while the arrangement shown in Figure 6 will disperse the carbonated liquid at a lesser rate of flow, the dispersed liquid will have a higher degree of carbonation.

Figure 7:
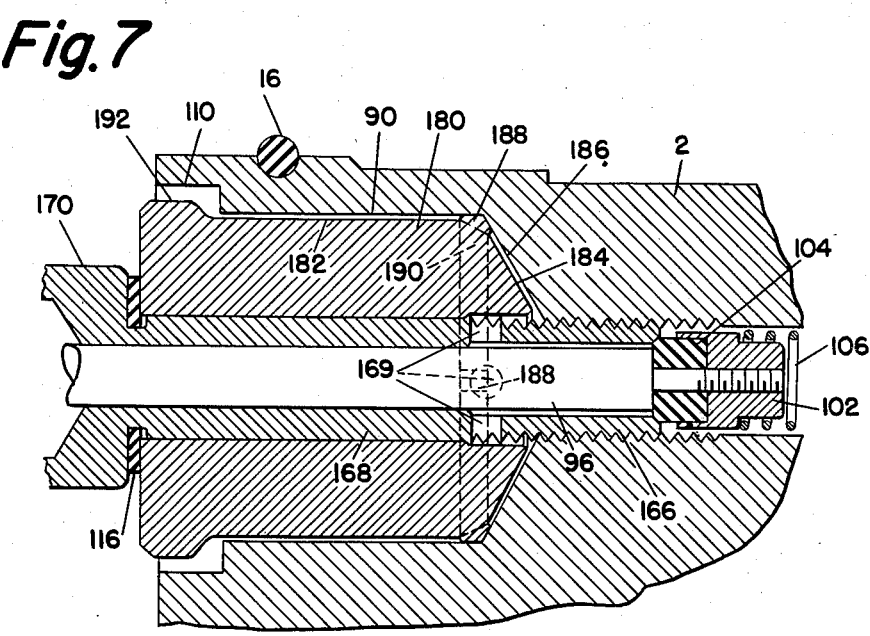
Figure 7 is a fragmentary longitudinal section of the valve showing a further modification of the soda delivery section of the valve.

Still another alternate form of the soda delivery section of the valve is shown in Figure 7. In this form the sintered disc is omitted. A spreader plug 180 is mounted on a sleeve 168—166 in sliding fit relation therewith. The outer surface 182 of the plug is of a lesser diameter than the bore 90 in the valve shank 2. The right hand end face 184 of the plug 182, as viewed in Figure 7, is provided with an inclined surface extending parallel to the inclined base 186 of the bore 90. The plug 180 is provided with outstanding projections 188 in the region of the juncture between the surfaces 182 and 184. The outstanding projections 188 are adapted to engage the surfaces 90 and 186 of the valve shank 2 and determine the clearance existing between the surfaces 184 and 186. The outstanding projections also serve to insure alignment between the outer surface 186 of the plug and the bore 90 in the valve shank. The left hand end of the plug 180, as viewed in Figure 7, is provided with an enlarged diameter portion 192 which is adapted to at least partly fill the recess 110 in the valve shank 2 which is provided to receive a sintered disc in the event that either of the modifications shown in Figures 1 or 6 are employed.

In operation of the modification of the valve shown in Figure 7, the flow of carbonated liquid passing through the annular space between the tubular member 166 and the stem 96 passes outwardly through the bores 169 in the tubular member 166 as in the abovementioned forms of the invention. After passing through the bores 169, the carbonated liquid passes through the space between the surfaces 184 and 186 which provides a space of increasing cross section as the liquid moves radially outwardly. The liquid thereafter passes through the spaces 190 between the projections 188, through the annular space between the outer surface 182 of the plug 180 and the bore 90 in the valve shank and is discharged past the left end of the plug 180, as viewed in Figure 7, by flowing over the enlarged diameter portion 192 of the plug.

In this form of the invention a gradual reduction in pressure of the carbonated liquid is accomplished as the liquid flows from the valve 104 to the annular discharge opening between the enlarged portion 192 of the plug and the recess 110. By properly selecting the spacing between sleeve 166 and the stem 96, between the surfaces 184 and 186, between the surfaces 182 and 90, and between the surfaces 192 and 110, there will be effected a progressive reduction in the pressure of the carbonated liquid and the result will be similar to that accomplished in the other forms of the invention hereinbefore described, namely, that the carbonated liquid which is received from a storage vessel under relatively high pressure passes through the dispensing valve and is discharged at atmospheric pressure with the pressure reduction being accomplished gradually rather than with any sharp or sudden pressure drops. Thus the carbonated liquid is dispensed with a maximum amount of carbon dioxide remaining in solution.

The modification shown in Figure 7 is particularly desirable where a filter is not likely to be used in which case there is a greater possibility that a sintered disc would become clogged than if a filter were employed. While it is a relatively simple matter to change or reverse the disc, as has been described, the tendency for operators is to call for service whenever a disc becomes clogged and, by means of the apparatus shown in Figure 7, this inconvenience is avoided.

It will be evident that in each form of the invention described there is provided a gradual or progressive reduction of the pressure of the carbonated liquid passing through the valve assembly. In the arrangement shown in Figure 1 this is accomplished by the pressure drops occurring successively as the liquid passes through the bores 87, past the shock absorber 118 and through the sintered disc 108. In the arrangement shown in Figure 6 the pressure drops occur as the liquid passes between the sleeve 166 and the stem 96 through the bores 169, through the annular passage within the surface 172, through the passage between the surface 176 and the sintered disc, and through the sintered disc 108. In the arrangement shown in Figure 7, the successive pressure drops occur as the liquid passes between the sleeve 166 and the stem 96, through the bores 169, through the space adjacent to the surface 184, through the space adjacent to the surface 182, and through the space adjacent to the surface 192. In each of these forms of the invention the cross sectional area of the flow path at any of the various stages where pressure reduction is being accomplished may be readily altered by replacement of a minimum number of parts, for example, the sleeves 168—166 and the spreader plugs in the arrangement shown in Figures 6 and 7, the sintered disc in the arrangements shown in Figures 1 and 6 and the shock absorber cup 118 and spring 120 in the arrangement shown in Figure 1.

It will be evident that various modifications may be made in the various embodiments of the invention disclosed herein without departing from the scope of the invention as set forth in the following claims.

What is claimed is:

1. A mixing valve for selectively controlling the flow of three liquids to a common discharge, said valve including a body member, three bores extending through said body member and each adapted to carry one of the liquids to be mixed, means controlling the flow of liquid from each of said bores to the common discharge, and a rotatable member actuating the flow controlling means, the flow controlling means including liquid conducting means in two of the three bores, said liquid conducting means each having a removable flow rate controlling orifice therein and being in liquid-tight engagement with said rotatable member, and means in said rotatable member adapted to cooperate with said liquid conducting means to provide passage of liquid from one of said two liquid conducting means to the common discharge when said rotatable member is rotated to one of two predetermined positions.

2. A mixing valve for controlling the flow of a plurality of liquids to a common discharge, said valve including a body member, a plurality of bores extending through said body member and each adapted to carry one of the liquids to be mixed, means controlling the flow of liquid from each of said bores to the common discharge, and a rotatable member actuating the flow controlling means, said rotatable member including a surface having a cam forming surface and a recess therein, the flow controlling means including a valve member controlling the flow through one of said bores and a member for actuating said valve member, said actuating member being actuated by the cam forming surface in said rotatable member when the member is rotated, the flow controlling means also including liquid conducting means communicating with another of said bores, said liquid conducting means being in liquid-tight engagement with said surface of said rotatable member, said recess in said rotatable member being adapted to cooperate with said liquid conducting means to provide passage for liquid from said liquid conducting means to the common discharge when said rotatable member is rotated to a predetermined position.

3. A mixing valve for controlling the flow of a plurality of liquids to a common discharge, one of the liquids having a gas dissolved therein, said valve including a body member, a plurality of bores extending through said body member and each adapted to carry one of the liquids to be mixed, and means controlling the flow of liquid through each of said bores to the common discharge, the flow controlling means of at least one of said bores including a member having a longitudinal bore and having a radial bore communicating therewith, a second member associated with the first mentioned member and having a bore for communication with said radial bore in said first mentioned member, said members being relatively movable with respect to each other, said radial bore and the bore in the second member being in communication with each other to a varying degree as the first and second members are moved with respect to each other, and means for controllably moving the first and second members with respect to each other to control the flow of liquid between the radial bore and the bore in the second member.

4. A mixing valve for selectively controlling the flow of three liquids to a common discharge, one of the liquids having a gas dissolved therein, said valve including a body member, three bores extending through said body member and each adapted to carry one of the liquids to be mixed, and means controlling the flow of liquid from each of said bores to the common discharge, the flow controlling means including valve means controlling the flow of the gas-containing liquid, a rotatable member having a portion of a surface thereof forming a cam for actuating said valve means to provide a flow of gas containing liquid, yieldingly mounted passage providing means within the other two of said bores each engaging said surface of said rotatable member, said rotatable member also including a recess adapted to cooperate selectively with an end of one or the other of the passages in said passage providing means when said rotatable member is rotated to provide a flow selectively of one of the other two liquids after flow of the gas containing liquid is initiated.

5. A mixing valve for selectively controlling the flow of three liquids to a common discharge, one of the liquids having a gas dissolved therein, said valve including a body member, three bores extending longitudinally through said body member and each adapted to carry one of the liquids to be mixed, and means controlling the flow of liquid from each of said bores to the common discharge, the flow controlling means including valve means controlling the flow of the gas containing liquid, a rotatable member having a portion of a surface thereof extending generally transversely of said bores forming a cam for actuating said valve means to provide a flow of gas containing liquid, yieldingly mounted passage providing means within the other two of said bores each engaging said surface of said rotatable member, said rotatable member also including a recess adapted to cooperate selectively with an end of one or the other of the passages in said passage providing means when said rotatable member is rotated to provide a flow selectively of one of the other two liquids after flow of the gas containing liquid is initiated.

6. A mixing valve for selectively controlling the flow of three liquids to a common discharge, one of the liquids having a gas dissolved therein, said valve including a body member, three bores extending through said body member and each adapted to carry one of the liquids to be mixed, and means controlling the flow of liquid from each of said bores to the common discharge, the flow controlling means including valve means controlling the flow of the gas-containing liquid, a rotatable member having a portion of a surface thereof forming a cam for actuating said valve means to provide a flow of gas containing liquid, yieldingly mounted passage providing means within the other two of said bores each engaging said surface of said rotatable member, said rotatable member also including a recess adapted to cooperate selectively with an end of one or the other of the passages in said passage providing means when said rotatable member is rotated to provide a flow selectively of one of the other two liquids after flow of the gas-containing liquid is initiated, and means for operating the valve means controlling the flow of gas containing liquid without rotation of said rotatable member.

References Cited in the file of this patent

UNITED STATES PATENTS

| Number | Name | Date |
| --- | --- | --- |
| Re. 23,109 | Di Pietro | May 10, 1949 |
| 184,573 | Becker | Nov. 21, 1876 |
| 434,094 | Sehwachheim | Aug. 12, 1890 |
| 545,749 | Thompson | Sept. 3, 1895 |
| 796,252 | Ross et al. | Aug. 1, 1905 |
| 970,225 | Holden | Sept. 13, 1910 |
| 1,173,871 | Royer | Feb. 29, 1916 |
| 1,215,111 | Carlsen | Feb. 6, 1917 |
| 1,427,606 | Leahy | Aug. 29, 1922 |
| 1,429,574 | England | Sept. 19, 1922 |
| 1,453,912 | Buckley et al. | May 1, 1923 |
| 1,822,117 | Travis | Sept. 8, 1931 |
| 1,953,164 | Geddes | Apr. 3, 1934 |
| 2,111,836 | Boyd | Mar. 22, 1938 |
| 2,118,356 | Money | May 24, 1938 |
| 2,179,611 | Brown | Nov. 14, 1939 |
| 2,302,089 | Aller | May 27, 1941 |
| 2,367,682 | Kehle | Jan. 23, 1945 |
| 2,377,473 | Wolcott | June 5, 1945 |
| 2,416,582 | Harr | Feb. 25, 1947 |
| 2,638,929 | Delany et al. | May 19, 1953 |
| 2,688,981 | Greer et al. | Sept. 14, 1954 |